United States Patent [19]
Shimamune

[11] Patent Number: 5,684,556
[45] Date of Patent: Nov. 4, 1997

[54] PROCESS FOR PRODUCING LIQUID CRYSTAL DEVICE

[75] Inventor: Masayuki Shimamune, Tokyo, Japan

[73] Assignee: Canon Kabushiki Kaisha, Tokyo, Japan

[21] Appl. No.: 458,297

[22] Filed: Jun. 2, 1995

[30] Foreign Application Priority Data

Jun. 2, 1994 [JP] Japan ............... 6-143864

[51] Int. Cl.⁶ ............................... G02F 1/1333
[52] U.S. Cl. ............................... 349/158; 349/190
[58] Field of Search ............... 359/62, 80, 82, 359/88; 349/153, 158, 189, 190

[56] References Cited

U.S. PATENT DOCUMENTS

| | | | |
|---|---|---|---|
| 4,094,058 | 6/1978 | Yasutake et al. | 359/80 |
| 4,610,510 | 9/1986 | Funada et al. | 359/80 |
| 4,717,257 | 1/1988 | Shimamune et al. | 141/8 |
| 5,459,597 | 10/1995 | Yamamoto et al. | 359/80 |
| 5,492,582 | 2/1996 | Ide et al. | 359/80 |

FOREIGN PATENT DOCUMENTS

| | | | |
|---|---|---|---|
| 55-02282 | 1/1980 | Japan | 359/80 |

*Primary Examiner*—William L. Sikes
*Assistant Examiner*—James A. Dudek
*Attorney, Agent, or Firm*—Fitzpatrick, Cella, Harper & Scinto

[57] ABSTRACT

A a liquid crystal device is produced through a process including at least the steps of: applying a first substrate and a second substrate to each other so as to leave a prescribed gap between the substrates to form a cell structure having at least one marginal side portion and having an injection port, injecting a liquid crystal into the prescribed gap through the injection part, and removing at least one marginal side portion described above, wherein the removal step is performed after the injection step.

5 Claims, 9 Drawing Sheets

PROCESS FOR PRODUCING LIQUID CRYSTAL DEVICE

FIELD OF THE INVENTION AND RELATED ART

The present invention relates to a process for producing a liquid crystal device, particularly to a process for producing a liquid crystal display device effecting display of image or information by utilizing an optical modulation characteristic of a liquid crystal material.

Heretofore, there have been proposed various processes for producing a liquid crystal device, particularly a liquid crystal display device displaying various images or information utilizing an optical modulation characteristic of a liquid crystal material.

Figure 1:
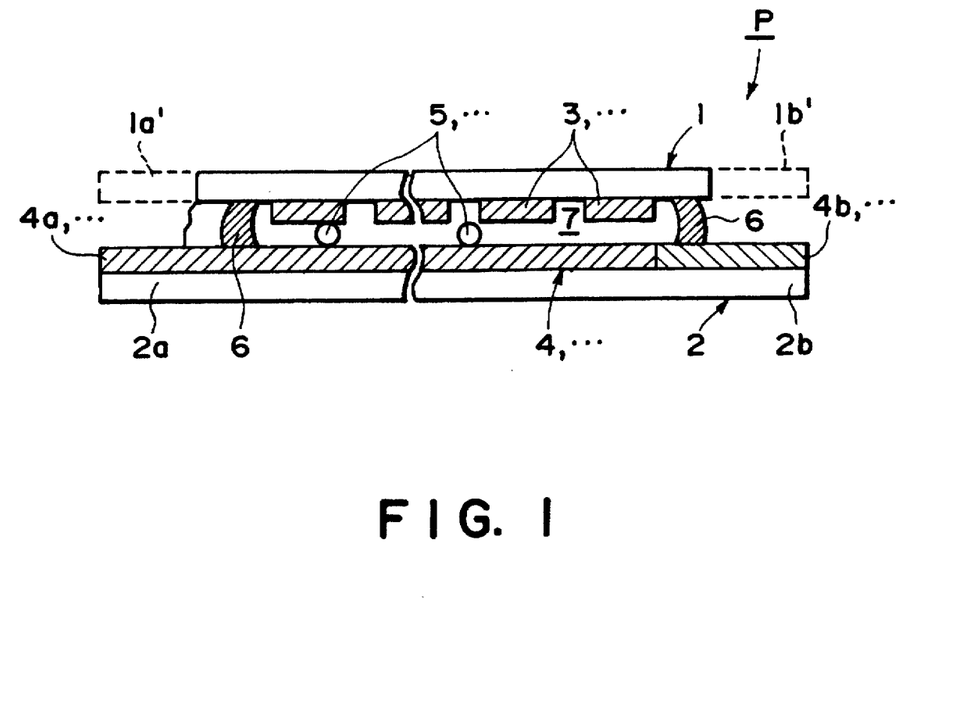
FIG. 1 is a schematic sectional view of an embodiment of a liquid crystal display device taken across A—A line in FIG. 2A described below.

An embodiment of a cell structure of such a liquid crystal display device will be specifically explained with reference to FIG. 1 (sectional view), FIG. 2A (plan view) and FIG. 2B (side view). FIG. 1 is a sectional view taken across A—A line in FIG. 2A.

Referring to FIG. 1, a liquid crystal display device P include a pair of substrates (two substrates) 1 and 2 on which a plurality of strip-shaped scanning electrodes 3, . . . or a plurality of strip-shaped data electrodes 4, . . . , respectively. These scanning electrodes 3, . . . and data electrodes 4, . . . intersect each other at a prescribed angle (generally at right angles) and each are coated with an insulating film (not shown) and an alignment film (not shown). The thus-formed two substrates 1 and 2 are disposed opposite to each other with a gap (e.g., about 0.5–10 μm) defined by a lot of spacer beads 5, . . . and a sealing agent 6 disposed so as to enclose the gap except for an injection port for injecting (or filling) a liquid crystal. The sealing agent 6 may preferably be applied between two substrates in a prescribed pattern with a width of e.g., 4 mm as shown in FIG. 2A so as to leave an injection port 9 for a liquid crystal. The injection port 9 may be designed depending upon a panel size of the liquid crystal display device P.

The liquid crystal display device P is required to connect the scanning electrodes 3, . . . and the data electrodes 4 formed on the substrates 1 and 2, respectively, with an external device. For example, referring again to FIG. 1, heretofore, the lower substrate 2 has been arranged so as to have terminal portions 2a and 2b over which corresponding portions of the upper substrate 1 are not present and on which terminal electrodes 4a, . . . and 4b, . . . for external connection are formed. In this instance, in case where the number of the electrodes 3, . . . and 4, . . . is small, these externally-connecting terminal electrodes (e.g., 4a and 4b) may be formed on only one terminal portion (e.g., 2a) or two terminal portions (preferably two opposite terminal portions e.g., 2a and 2b) with respect to one of the substrates 1 and 2.

Figures 2A, 2B:
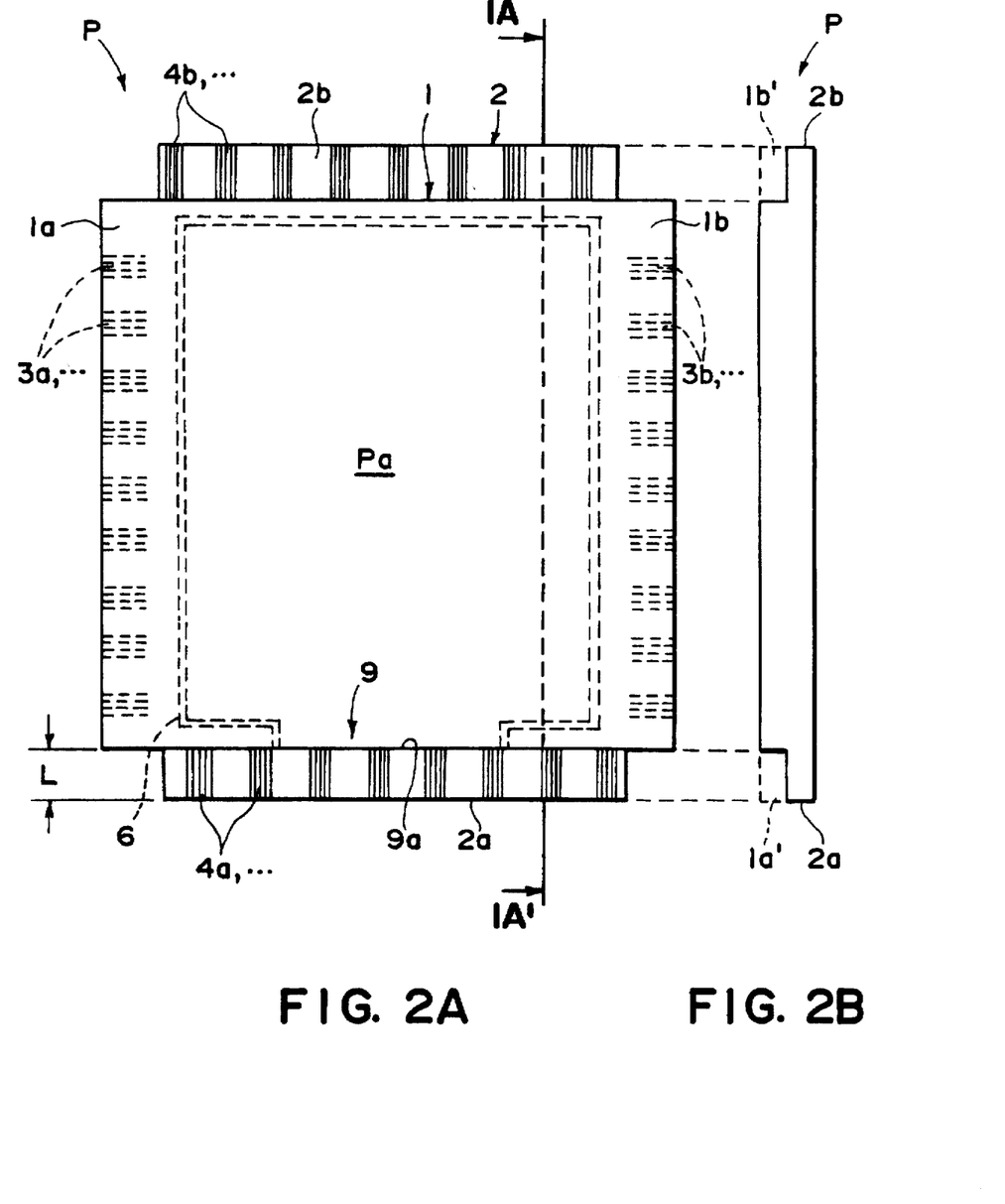
FIG. 2A is a schematic plan view of an embodiment of a liquid crystal display device.
FIG. 2B is a side view of the liquid crystal device shown in FIG. 2A.

In case where the number of the electrodes 3, . . . and 4, . . . is increased in order to realize high-definition display and a large-sized panel, the liquid crystal display device P is required to have externally-connecting terminal electrodes at three or four terminal portions of the substrates 1 and/or 2, e.g., as shown in FIG. 2A. Referring to FIG. 2A, in addition to two groups of externally-connecting terminal electrodes 4a, . . . and 4b, . . . formed on the substrate terminal portions 2a and 2b in the above-described manner, additional two groups of externally-connecting terminal electrodes 3a, . . and 3b, . . . are formed on the other substrate terminal portions 1a and 1b in the same manner as in the case of the terminal electrodes 4a, . . . and 4b, . . . , thus providing the substrate 1 with two groups of terminal electrodes 3a, . . . and 3b, . . . and providing the other substrate 2 with two groups of terminal electrodes 4a, . . . and 4b, . . .

Although the externally-connecting terminal electrodes 4a, . . . and 4b, . . . are formed on the terminal portions 2a and 2b of the substrate 2 being elongated widthwise as compared with the substrate 1 (FIG. 1), this is not because different widths of two substrates 1 and 2 are used in an initial production step but because, during the production process of a liquid crystal display device P, one of the substrates 1 and 2 is subjected to removal of marginal side portions (1a' and 1b' in FIG. 1). Incidentally, in FIG. 1, the marginal side portion 1a' is present on the injection port side (e.g., 9 in FIG. 2A).

Figure 3:
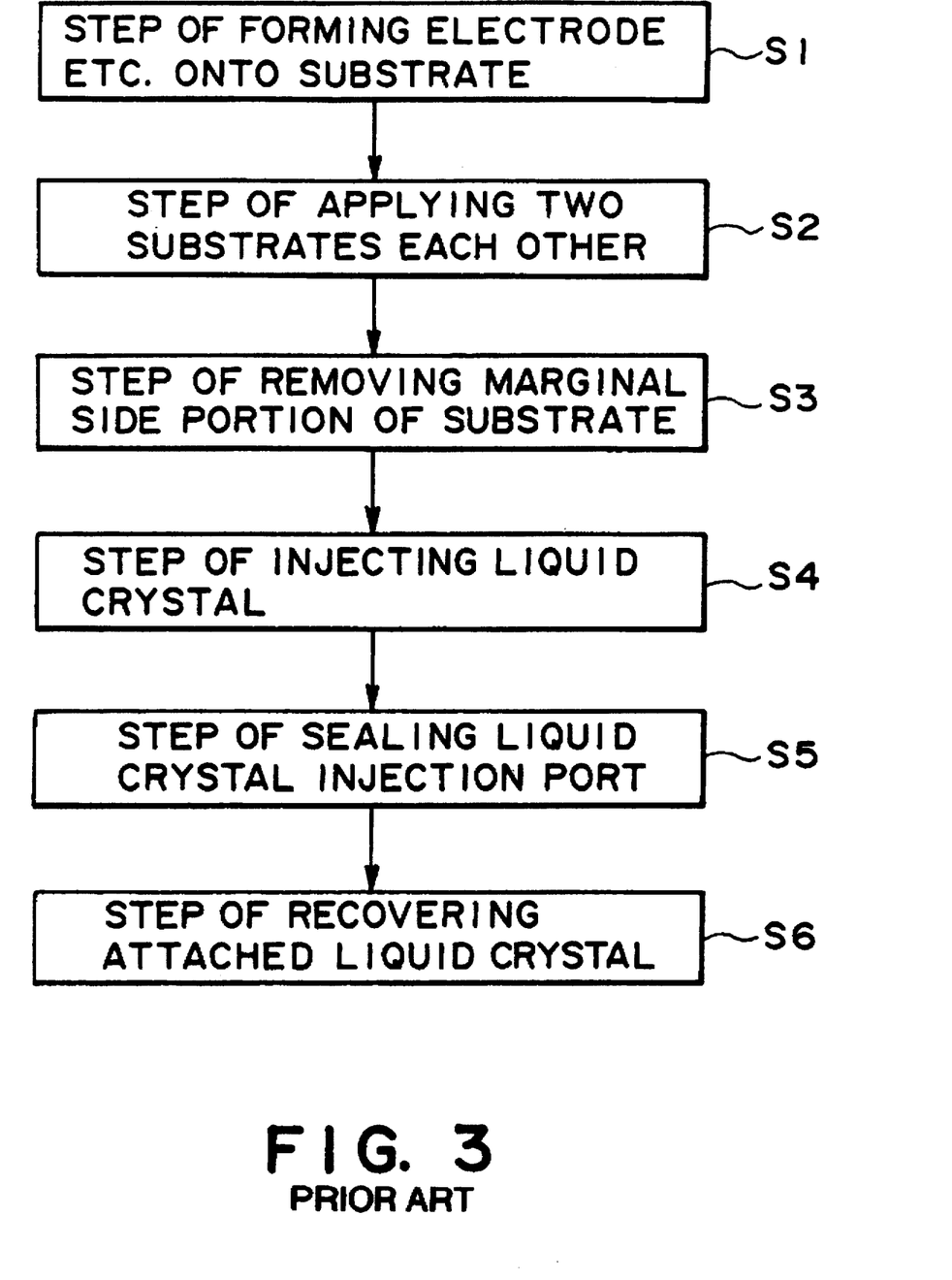
FIG. 3 is a flowchart for illustrating a conventional process for producing a liquid crystal display device.

Then, a conventional process for producing a liquid crystal display device P as shown in FIG. 1 or FIGS. 2A and 2B will be explained along a flow chart thereof as shown in FIG. 3.

First, substantially identical-sized two substrates 1 and 2 (first substrate and second substrate) are coated with electrodes 3, . . . and 4, . . . and further coated with insulating films (not shown), respectively (Step 1 (S1 in FIG. 3)). The thus-formed substrates 1 and 2 are subjected to aligning treatment (e.g., rubbing) and, on one of the substrates 1 and 2 (e.g., the first substrate), spacer beads 5, . . . are dispersed. The other substrate 1 or 2 (e.g., the second substrate) is coated with a sealing agent 6 in a prescribed pattern as shown in FIG. 2A so as to leave an injection port 9 for liquid crystal injection. The above first substrate is superposed on or is applied to the second substrate each other to prepare a blank cell (not containing a liquid crystal 7) having a prescribed gap between the substrates 1 and 2 (Step 2 (S2)). Marginal side portions 1a' and 1b' (enclosed by dotted lines and a solid line shown in FIGS. 1 and 2B. Hereinafter, sometimes referred also to as "unnecessary (or removal) portion") of the substrate 1 is removed therefrom by cutting with, e.g., a wheel-shaped cutter to provide terminal portions (i.e., portions corresponding to marginal side portions) 2a and 2b of the substrate 2 with externally-connecting terminal electrodes 4a, . . . and 4b, . . . (FIG. 1). In the case of FIG. 2, in the same manner as in the case of FIG. 1, terminal portions 1a and 1b of the substrate 1 are provided with externally-connecting terminal electrodes 3a, . . . and 3, . . . by cutting marginal side portions of the substrate 2, thus providing four groups of externally-connecting terminal electrodes 3a, . . . , 3b, . . . , 4a, . . . , and 4b, . . . (Step 3 (S3)). Then, a liquid crystal 7 is injected into the above-treated blank cell from the injection port 9 after applying it to the injection port 9 (Step 4 (S4)). The injection port 9 is sealed up with a sealing agent to prepare a liquid crystal display device P (Step 5 (S5)). Thereafter, an excessive or attached liquid crystal is recovered by a prescribed manner to complete the process for producing the liquid crystal display device P (Step 6 (S6)).

However, the above-described conventional process for producing the liquid crystal display device P has encountered problems such that the terminal portions (e.g., 1a and 1b in FIG. 2A) provided with the externally-connecting terminal electrodes (e.g., 3a, . . . and 3b, . . . in FIG. 2A) are required to be held for fixing the liquid crystal display device P (exactly the blank cell) in Step 4 (injection step) etc., thereby being liable to break the substrate terminal portions or the externally-connecting terminal electrodes and that a protective means (or step) for protecting such structural elements is required of the liquid crystal display device or the production process therefor. These problems are particularly noticeable in the case of removing four marginal side portions as shown in FIG. 2A.

Further, the conventional process described above has involved various problems described below in the injection step (S4 in FIG. 3) due to the removal of the unnecessary portions (marginal side portions) 1a' and 1b' (S3 in FIG. 3).

Figure 4A:
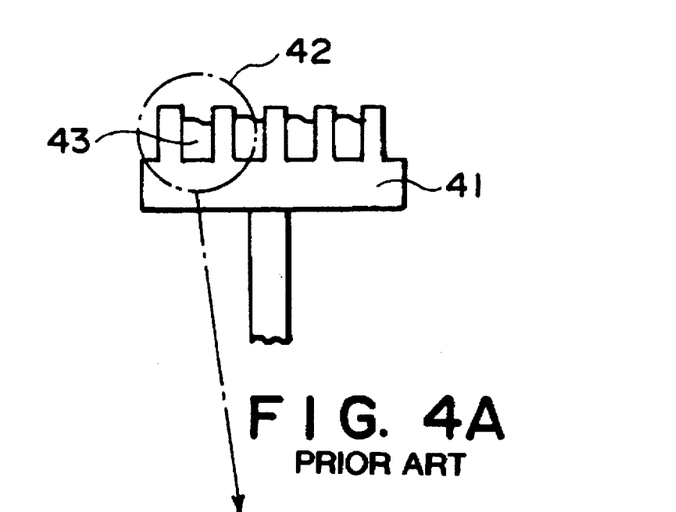
FIG. 4A is a schematic sectional view of an embodiment of an applicator used in an injection step of a liquid crystal.
Figure 4B:
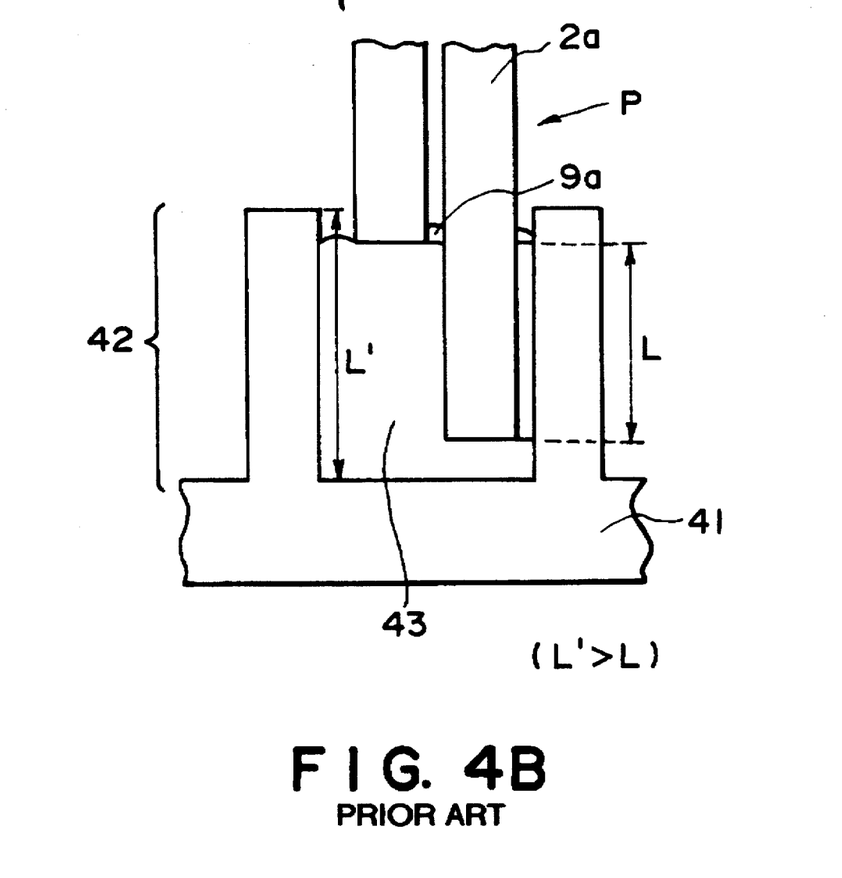
FIG. 4B is a partially enlarged view of FIG. 4A for illustrating a method of applying the liquid crystal, respectively, in the conventional production process shown in FIG. 3.
Figure 5A:
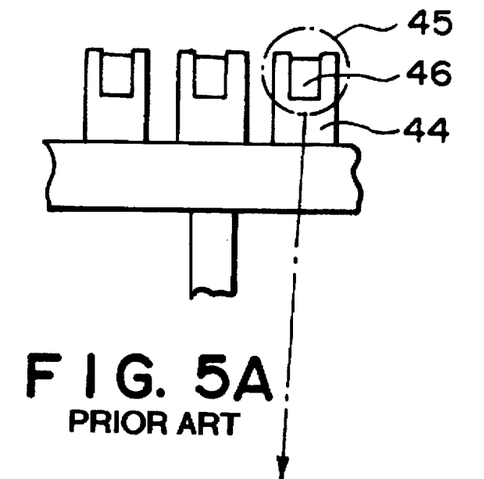
FIG. 5A is a schematic sectional view of another embodiment of an applicator used in an injection step of a liquid crystal.
Figure 5B:
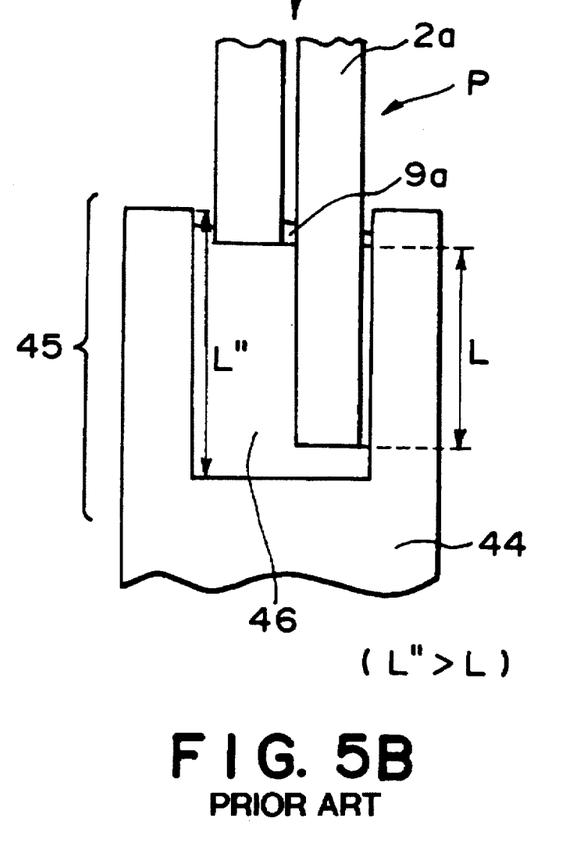
FIG. 5B is a partially enlarged view of FIG. 5A for illustrating a method of applying the liquid crystal, respectively, in the conventional production process shown in FIG. 3.

In the liquid crystal injection step (S4), the liquid crystal is applied to the injection port 9 (exactly an opening edge 9a of the injection port 9) and injected into the gap between the substrates by an applicator as shown in FIGS. 4A an 4B or FIGS. 5A and 5B.

Referring to FIG. 4A, an applicator 41 has a plurality of recess portions 42 which is supplied or filled with a liquid crystal 43 from a liquid crystal tray or reservoir (not shown). The applicator is caused to come in contact with the edge portion 9a of the liquid crystal display device P at the top surface of the liquid crystal 43 contained in the recess portion 42 as shown in FIG. 4B, thus applying the liquid crystal 43 to the edge portion 9a (of the injection port as shown in FIG. 2A).

FIG. 5A shows another applicator 44 having a plurality of recess portions 45 which is supplied or filled with a liquid crystal 46 from a liquid crystal tray (not shown) or by using a liquid crystal-supplying means (not shown). The recess portions 45 are independent of (or separated from) each other. The application process of this instance is performed in the same manner as in that using the applicator 41 shown in FIGS. 4A an 4B.

Referring to FIG. 4B and FIG. 5B, the opening edge 9a of the injection port of the liquid crystal display device P is apart from the lower edge of the substrate terminal portion 2a by a prescribed length (L). Accordingly, in order to inject the liquid crystal 43 or 46 into a display layer (not shown) of the device P through the injection port, the recess portions 42 or 45 of the applicator 41 or 44 are required to have a prescribed height (or depth) L' or L" (L', L">L). As a result, the amount of the liquid crystal 43 or 46 temporarily stored in the recess portion 42 or 44 or the liquid crystal tray (not shown) becomes considerably large, whereby a large amount of the liquid crystal not injected into the display layer of the device P is placed in an environment of heating and high vacuum since the liquid crystal used in the injection step (S4 of FIG. 3) is not completely consumed at the same time, thus resulting in a deterioration in, e.g., physical properties of the liquid crystal.

In the conventional process for producing the liquid crystal display device P, the removal step (S3) is performed before the injection step (S4) as shown in FIG. 3. The display layer of the liquid crystal display device P (exactly the blank cell) is liable to include a contaminant (e.g., cuttings) left in the vicinity of the injection port due to the removal of the marginal side portions (or unnecessary portions) 1a' and 1b'. As a result, such a contaminant adversely affects an alignment characteristic of the liquid crystal, driving characteristics of the resultant liquid crystal display device, etc.

In addition, after the injection Step (S4), the contaminant also attaches to the externally-connecting connecting terminal electrode (e.g., 4a, . . . in FIGS. 1 and 2A) or the vicinities thereof. Accordingly, when the liquid crystal attached to such an externally-connecting terminal electrode is recovered in the recovery step (S6), the liquid crystal tray for recovering the attached liquid crystal includes the contaminant caused by the removal of the unnecessary portions 1a' and 1b' after all. Consequently, the liquid crystal display device P is required to remove the contaminant from the liquid crystal tray, thus complicating the production process thereof.

On the other hand, the liquid crystal to be injected into the blank cell is applied to the opening edge 9a (as shown in FIGS. 4B and 5B) of the injection port in an isotropic liquid state (by heating), thus resulting in an unstable flow behavior of the applied liquid crystal. In the conventional production process as shown in FIG. 3, the opening edge 9a of the injection port 9 is closer to the display portion Pa by a width (e.g., "L" in FIGS. 4B and 5B) of the marginal side portion 1a' as shown in FIGS. 2A, 2B, 4B and 5B, so that the liquid crystal being initially applied to the opening edge 9a is immediately introduced into the display portion Pa prior to the following uniform injection stage at a constant speed, thus causing an injection irregularity. As a result, the display portion Pa after being filled with the liquid crystal is liable to cause alignment failure.

SUMMARY OF THE INVENTION

In view of the above circumstances, an object of the present invention is to provide a process for producing a liquid crystal device effective in obviating breakage to a substrate or an electrode at the time of holding a cell structure in an injection step of a liquid crystal.

Another object of the present invention is to provide a process for producing a liquid crystal device allowing a liquid crystal before injection not to be placed in an environment of heating and high vacuum for a long period of time in the liquid crystal injection step.

Further object of the present invention is to provide a process for producing a liquid crystal device effective in preventing inclusion of a contaminant (e.g., cuttings), generated by a removal step of an unnecessary portion of a substrate, in a liquid crystal which is introduced into a display portion and is recovered to a liquid crystal tray (or reservoir) or in the resultant liquid crystal device.

According to the present invention, there is provided a process for producing a liquid crystal device, comprising at least the steps of: applying a first substrate and a second substrate to each other so as to leave a prescribed gap between the substrates to form a cell structure having at least one marginal side portion and having an injection port, injecting a liquid crystal into the prescribed gap through the injection port, and removing said at least one marginal side portion, wherein the removal step is performed after the injection step.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

According to the process for producing a liquid crystal device of the present invention, a liquid crystal display device as shown in FIGS. 1, 2A and 2B is provided as a result similarly as in the conventional production process as described above.

Figure 6:
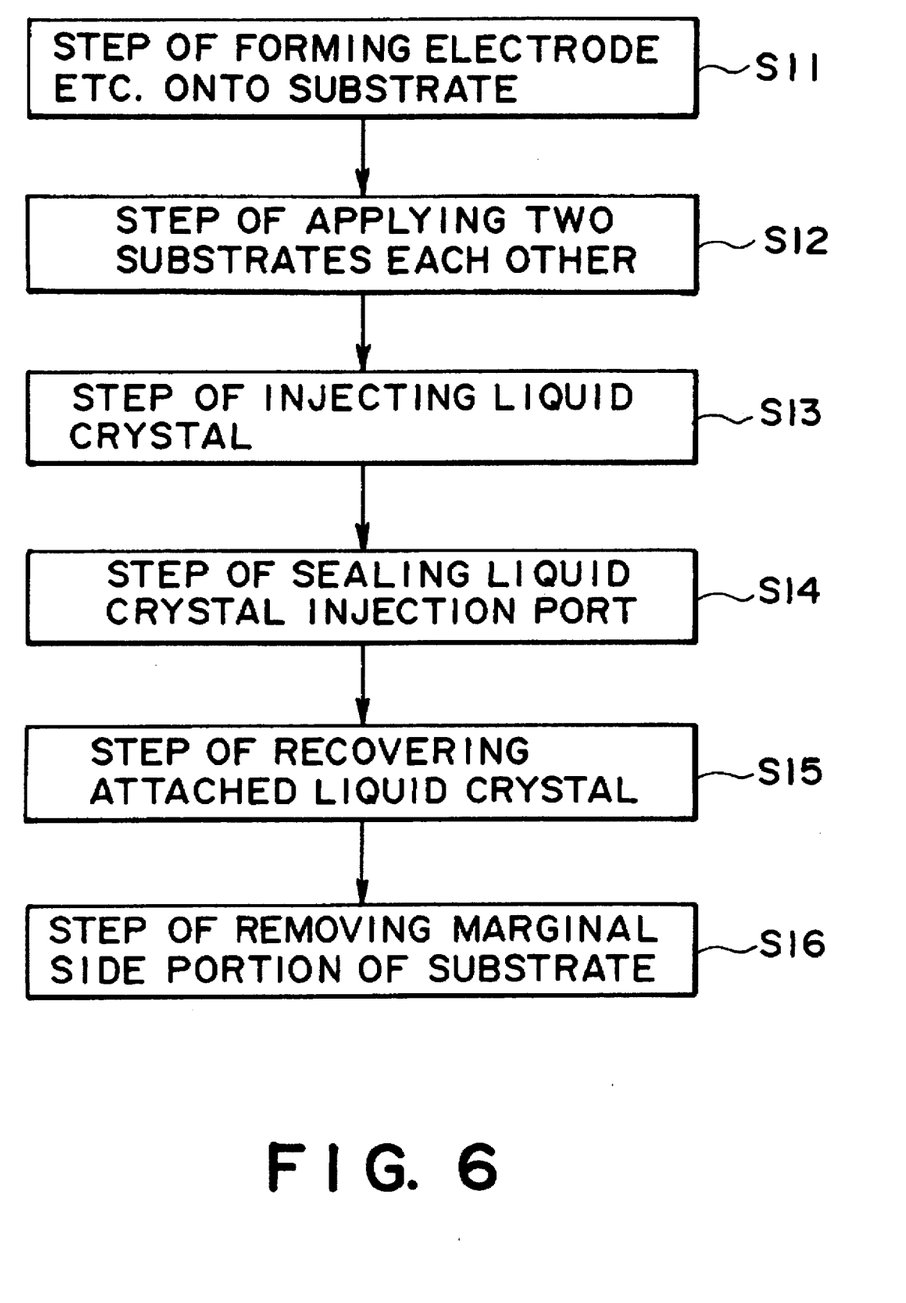
FIG. 6 is a flow chart for illustrating a process for producing a liquid crystal display device according to the present invention.

A preferred embodiment of the production process according to the present invention will be explained along a flow chart as shown in FIG. 6.

First, a blank cell is prepared through Steps 11 and 12 (S11) and (S12) shown in FIG. 6 in the same manner as in Steps (S1) and (S2) of the conventional process shown in FIG. 3.

Figure 7:
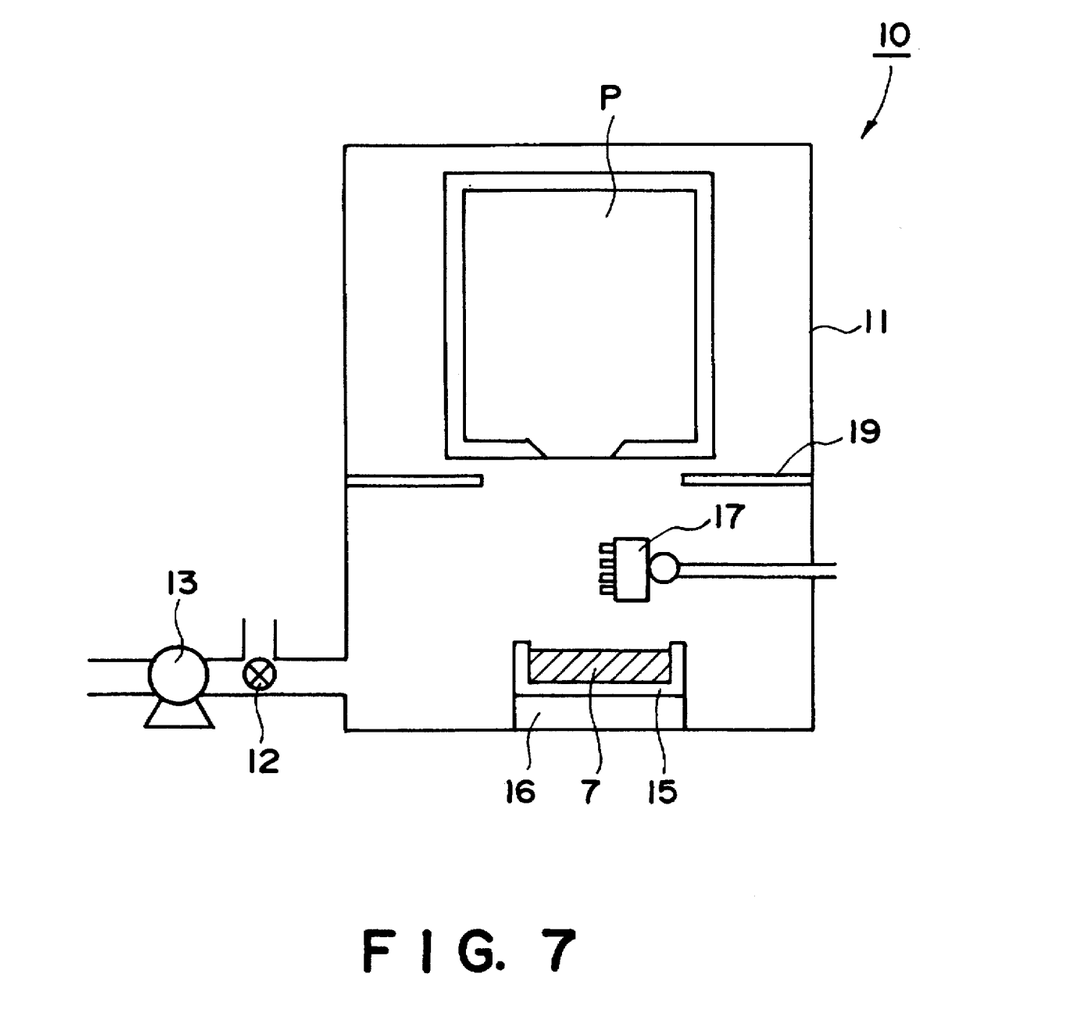
FIG. 7 is an embodiment of a schematic sectional view of a liquid crystal injection apparatus used in the present invention.

The blank cell is subjected to injection of a liquid crystal by setting it within a liquid crystal injection apparatus (Step 13 (S13)). FIG. 7 shows an embodiment of the liquid crystal injection apparatus.

Referring to FIG. 7, a liquid crystal injection apparatus 10 includes a vacuum chamber 11 to which a vacuum pump 13 is connected via a leakage valve 12. At a lower portion of the vacuum chamber 11, a liquid crystal tray (or reservoir) 15 is disposed. The liquid crystal tray stores a liquid crystal 7 and is mounted on a heater 16 for heating the liquid crystal 7 so as to have a temperature (e.g., about 90° C.) sufficient to assume an isotropic phase. Above the liquid crystal tray 15, a liquid crystal-applying jig 17 movably supported by a supporting means is disposed. The liquid crystal-applying jig 17 is designed so as to apply the liquid crystal 7 in the liquid crystal tray 15 to an injection port of the blank cell. Examples of the liquid crystal-applying jig 17 may include an applicator as shown in FIGS. 8A and 8B or FIGS. 9A and 9B. The applicator used in the present invention is basically operated in the same manner as in the case of that of FIGS. 4A and 4B or FIGS. 5A and 5B described above. The liquid crystal applying jig 17 has a heating mechanism (not shown) so as to keep the liquid crystal at an appropriate temperature for application. At an upper portion of the vacuum chamber 11, a blank cell P to be filled with the liquid crystal 7 is held or fixed by a jig (not shown). The blank cell P is held by the jig at a terminal portion including a marginal side portion (unnecessary portion, e.g., 1a') to be removed in the latter step (S6). Incidentally, between the blank cell P and the liquid crystal-applying jig, a shutter 19 is disposed.

The injection operation of the liquid crystal 7 is performed as follows.

The blank cell P and the liquid crystal tray 15 are set within the vacuum chamber 11, which is then reduced in pressure by driving the vacuum pump 13. The liquid crystal 7 in the liquid crystal tray 15 is heated up to a temperature at which the liquid crystal 7 shows isotropic phase by switching the heater on, while an heater within the liquid crystal-applying jig 17 is also switched. Then, the liquid crystal-applying jig 17 is operated, whereby the liquid crystal 7 in the liquid crystal tray 15 is applied to edges of terminal portions (e.g., 1a' and 2b shown in FIGS. 8B and 9B) of two substrates in the vicinity of the opening edge (e.g., 9a in FIGS. 8B and 9B). The attached liquid crystal is introduced into the display portion of the cell through a gap between the terminal portions (e.g., between the portions 1a' and 2a) of the substrates by capillary action. After the injection of the liquid crystal, the reduced pressure within the vacuum chamber 11 is restored to the atmospheric pressure to complete the injection operation.

The resultant liquid crystal display device filled with the liquid crystal is sealed with a sealing agent (Step 14 (S14)), followed by recovery of the attached liquid crystal in the vicinity of the opening edge 9a of the injection port 9 (Step 15 (S15)). Finally, marginal side portions (e.g., 1a' and 1b' as shown in FIG. 1) are removed by, e.g., cutting to provide the corresponding terminal portions (e.g., 2a and 2b as shown in FIG. 1) with externally-connecting terminal electrodes (e.g., 4a, . . . and 4b, . . . as shown in FIG. 1). The cutting of the marginal side portions may preferably be performed, e.g., by cutting the portions along the prescribed cutting line with a wheel-shaped cutter (e.g., having a diameter of several mm) under pressure (Step 16 (S16)). As described above, the liquid crystal display device as shown in FIG. 1 or FIGS. 2A and 2B is prepared.

The liquid crystal used in the present invention may include a twisted nematic (TN) liquid crystal, a super twisted nematic (STN) liquid crystal, a cholesteric (Ch) liquid crystal, a smectic (Sm) liquid crystal and a chiral smectic (Sm*) liquid crystal. The liquid crystal used in the present invention may preferably be a chiral smectic liquid crystal having ferroelectricity and having, e.g., the following phase transition series (°C.):

$$Cry \xrightarrow{-3° C.}$$

wherein Cry: crystal phase; SmC*: chiral smectic C phase; SmA: smectic A phase; Ch: cholesteric phase; and Iso: isotropic phase.

As described above, according to the process for producing the liquid crystal device of the invention, the blank cell still has the marginal side portion (unnecessary portion, e.g., 1a') during the injection step (S13), so that the substrates are held on the outer sides of the substrates in the injection step. As a result, breakage of the externally-connecting terminal electrodes formed on the inner sides of the substrates can be avoided, thus requiring no additional protection means of the electrodes. On the other hand, in the conventional process, the externally-connecting terminal electrode and the substrate each held in the injection step are liable to be broken as described above since the marginal side portions have already been removed before the injection step. Accordingly, the production process of the invention provides a high productivity and low production costs.

Since the unnecessary portion (marginal side portion) (e.g., 1a' as shown in FIG. 2A) is not removed before the injection process in the present invention, the applicator (as the liquid crystal-applying jig 17 in FIG. 7) shown in FIGS. 8A and 8B or FIGS. 9A and 9B is not required to have large recesses and it is unnecessary to use a deep liquid crystal tray (e.g., one used in the conventional process). As a result, the liquid crystal 7 stored in the liquid crystal tray is consumed in a short time and is not placed in an environment of heating and high vacuum for a long time. The physical properties of the liquid crystal used in the injection step are also little determined. This advantage is described more specifically while making a comparison between the injection step ((S13) of FIG. 6) in the process of the invention and that ((S4) of FIG. 3) in the conventional process.

Figure 8A:
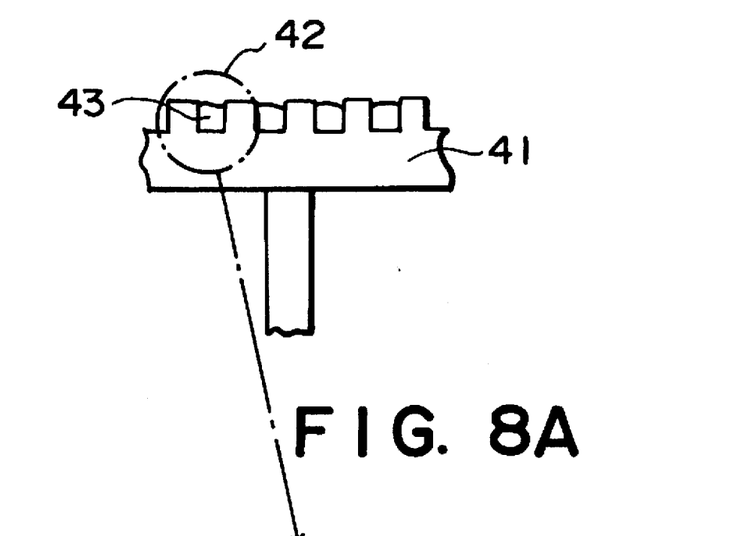
FIG. 8A is a schematic sectional view of an embodiment of an applicator used in an injection step of a liquid crystal.
Figure 8B:
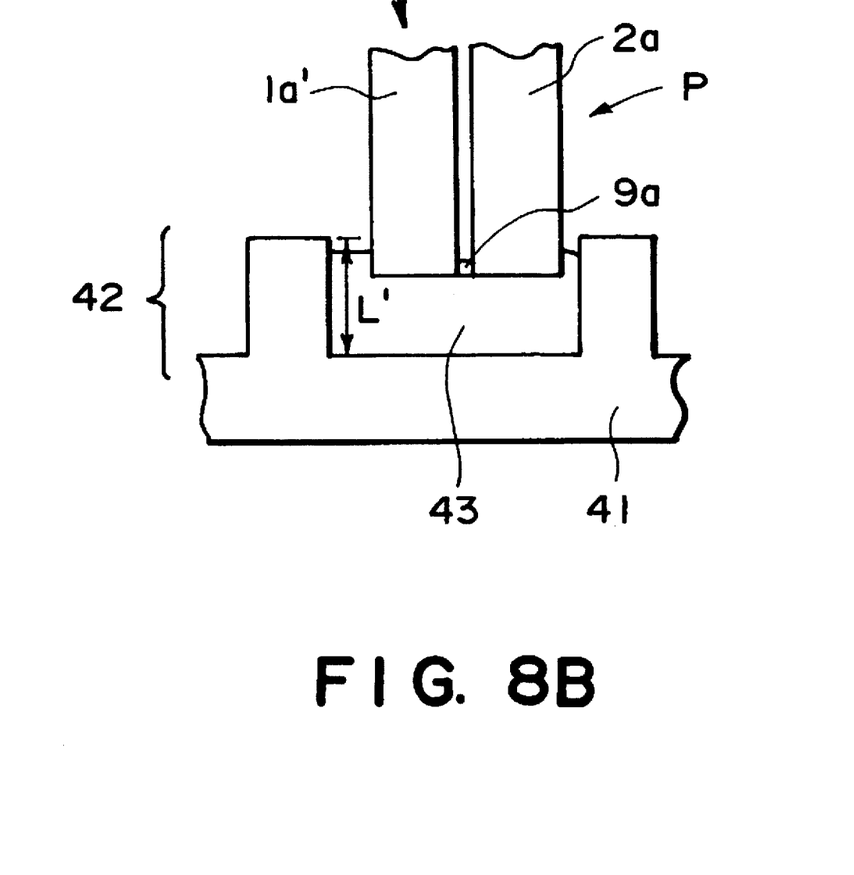
FIG. 8B is a partially enlarged view of FIG. 8A for illustrating a method of applying the liquid crystal, respectively, in the production process of the invention shown in FIG. 6.

First, the applicator shown in FIGS. 8A and 8B used in the process of the invention is operated in the same manner as in the case of that shown in FIGS. 4A and 4B used in the conventional process. The difference between the two applicators is that the recess portion 42 in FIGS. 8A and 8B has a height or depth (L') smaller than a height (L') of the recess portion in FIGS. 4A and 4B.

Figure 9A:
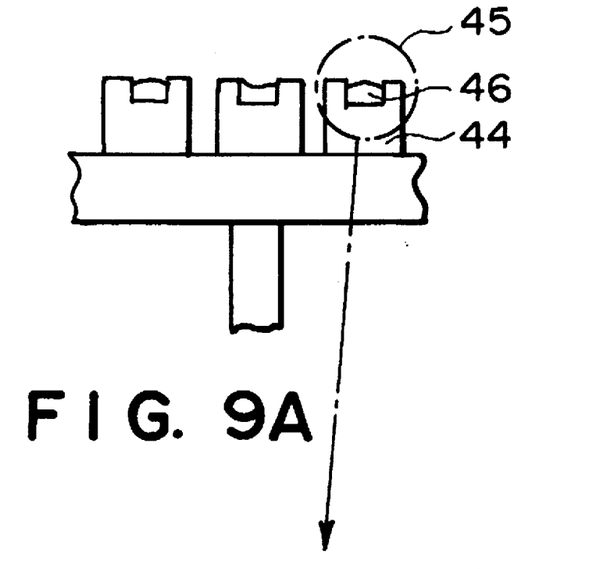
FIG. 9A is a schematic sectional view of another embodiment of an applicator used in an injection step of a liquid crystal.
Figure 9B:
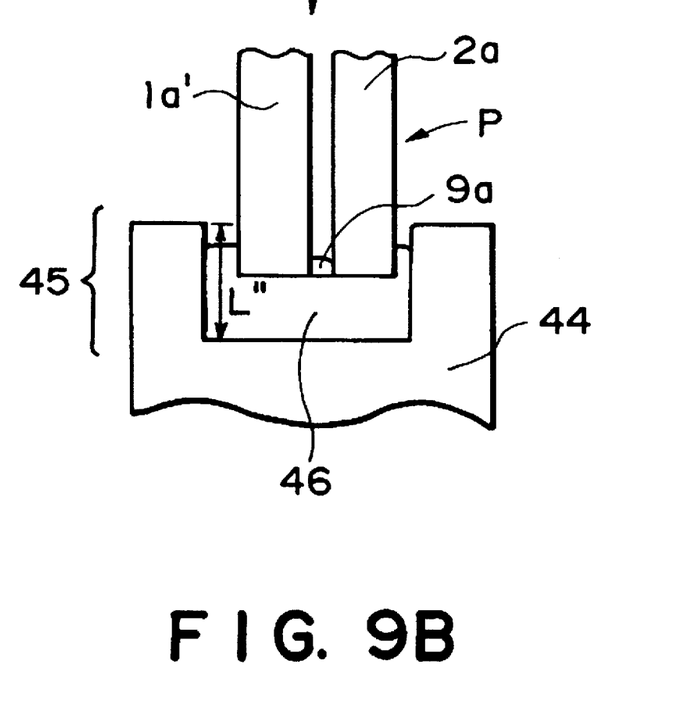
FIG. 9B is a partially enlarged view of FIG. 9A for illustrating a method of applying the liquid crystal, respectively, in the production process of the invention shown in FIG. 6.

The above relationships also apply to those between another applicator shown in FIGS. 9A and 9B used in the process of the invention and that shown in FIGS. 5A and 5B used in the conventional process.

When the application step shown in FIG. 8B is compared with that shown in FIG. 4B, the blank cell P (in FIG. 8B) is caused to be in contact with the liquid crystal surface at an identical level as to both substrate edges and the edge portion 9a of the injection port since the marginal side portion 1a' is not removed at this stage. As a result, the height (L') of the recess 42 is designed to be small. In other words, the amount of the liquid crystal 43 stored in the recess 42 or the liquid crystal tray is minimized, thus being consumed in a short time without impairing the physical properties.

In the present invention, the removal step ((S16 of FIG. 6) is performed after the injection step ((S13) of FIG. 6), whereby a contaminant, such as cuttings, is barely attached to the vicinities of the edge portion of the injection port during the injection step. Consequently, the contaminant little hardly intrudes into not only the liquid crystal cell in the injection step (S13) but also the liquid crystal tray in the removal step (S16). Since the production process of the invention is not required to removal operation of or removing means for the contaminant, the liquid crystal display device with high performances is produced through a simplified process and is also produced inexpensively.

As described hereinabove, particularly, in the case of adopting a liquid crystal device in a large-sized liquid crystal display device with high definition, a pair of substrates of the liquid crystal display device are required to provide four terminal portions as a whole with externally-connecting terminal electrodes as shown in FIG. 2A. In this case, since the edge portion of the injection port is necessarily present on the terminal electrode side, (i.e., the marginal side portion side), the above-mentioned problems in the conventional process, particularly, in the injection step thereof are minimized. The production process of the present invention is very effective in alleviating or solving such problems because the removal step (S16) of the marginal side portion of the substrate is performed after the injection step (S13) of the liquid crystal as shown in FIG. 6.

In case where externally-connecting terminal portions are provided on three terminal portions, as a whole, of the pair of substrates, it is possible to leave the edge portion of the injection port on the terminal portion side free from the externally-connecting terminal electrodes in order to alleviate the contamination of the terminal portions provided with the externally-connecting terminal electrodes. In this case, however, a threshold voltage for driving the liquid crystal display device on a side opposite to the injection port side of one substrate is liable to vary depending upon the kinds of the liquid crystal (e.g., a chiral smectic liquid crystal), thus resulting in a lowered threshold voltage on the side (apart from the injection port side) in some cases. On the other hand, an effective driving voltage at a portion in the vicinity of the injection port is relatively lowered since the portion is apart from the externally-connecting terminal electrode side to which an externally electric signal is applied. As a result, an apparent threshold voltage at the portion in the vicinity of the injection port is increased in some cases.

In view of the above characteristics regarding the threshold voltage, the liquid crystal display device may preferably have a terminal portion provided with externally-connecting terminal electrodes on the injection port side in the case of providing three terminal portions with the externally-connecting terminal electrodes because a threshold distribution over the entire display portion is minimized or suppressed by counterbalancing the decreased apparent threshold voltage, due to the liquid crystal used of the portion, on the opposite side of the injection port with the increased apparent threshold voltage imparted to the portion due to such an arrangement that the portion is away from the injection port. In this instance, the production process of the invention wherein the removal step is performed after the injection step is advantageous since the formation of the externally-connecting terminal electrodes on the injection port side involves the above-described deficiencies such as a contaminant and breakage of the electrodes. Accordingly, the production process of the invention is particularly suitable for a liquid crystal display device with a high definition and a large display area.

During the injection step in the production process according to the present invention, the edge portion 9a of the injection port to which the liquid crystal is applied is away from the display portion by a prescribed distance as apparent from FIG. 2A and FIG. 8A. Accordingly, the prescribed distance of the injection port is effective in obviating alignment failure caused by ununiform injection behavior (i.e., a liquid crystal applied to the edge portion is not introduced into the display portion at a constant speed) because the liquid crystal in an isotropic liquid state is stopped in the position within the injection port when the liquid crystal has an unstable flowability at an initial stage and is not intruded into the display portion due to the prescribed distance of the injection port.

The prescribed distance between the edge portion of the injection port and the entrance of the display portion (i.e., a boundary between the display portion and the injection portion) is also effective in preventing air intrusion into the display portion even when the pressure within the vacuum chamber is restored to the atmospheric pressure in the injection step as shown in FIG. 7. As a result, a large amount of the liquid crystal is introduced into the display portion, thus suppressing injection failure and alignment failure accompanied thereby.

As described above, according to the process for producing a liquid crystal device of the present invention, by performing the removal step of the unnecessary portion (marginal side portion) after the injection step of the liquid crystal, it is possible to obtain the following advantages.

(1) An amount of the liquid crystal placed in an environment of heating and high vacuum for a long time can be minimized to prevent deterioration in physical properties of the liquid crystal used in the injection step.

(2) The liquid crystal can be uniformly injected into the display portion to suppress injection failure resulting in alignment failure.

(3) Inclusion of a contaminant in the display portion and in the liquid crystal tray can be prevented to simplify the production process and to provide the resultant liquid crystal with high performances and inexpensiveness.

(4) The breakage to the substrate terminal portion and/or the externally-connecting terminal electrodes can be suppressed to obviate the necessity of protecting the terminal electrodes. As a result, the productivity and production efficiency (including production cost) of the liquid crystal display device can be improved.

What is claimed is:

1. A process for producing a liquid crystal device, comprising the steps of:

selecting a first substrate having thereon an electrode and a second substrate having thereon an electrode;

disposing said first substrate and said second substrate so as to leave a prescribed gap between the substrates to form a cell structure having an injection port and accompanied with mutually aligned confronting marginal side portions of the first and second substrates;

injecting liquid crystal into the prescribed gap through the injection port; and removing one of said confronting marginal side portions of one of the first and second substrates at the injection port side to expose a portion of the electrode on the other confronting marginal side portion of the other substrate, wherein the removal step is performed after the injection step.

2. A process according to claim 1, wherein, in the removal step, the first substrate has both of the two marginal side portions in a first direction and is subjected to removal of said both marginal side portions in the first direction with an externally-connecting terminal electrode, and the second substrate has both of the two marginal side portions in a second direction perpendicular to the first direction and is subjected to removal of said both marginal side portions in the second direction perpendicular to the first direction the second direction with an externally-connecting terminal electrode.

3. A process according to claim 1, wherein, in the removal step, the first substrate has two marginal side portions in a first direction and is subjected to removal of both of the two marginal side portions in the first direction with an externally-connecting terminal electrode, and the second substrate has one marginal side portion located at the injection port side in a second direction perpendicular to the first direction and is subjected to removal of said one marginal side portion in the second direction, to provide a corresponding terminal portion on the injection port side of the first substrate with an externally-connecting terminal electrode.

4. A process according to claim 1, wherein the injection step includes the steps of filling a plurality of recess portions of an applicator with liquid crystal and applying the liquid crystal to the injection port.

5. A process according to claim 4 wherein the plurality of recess portions are independent of each other.

* * * * *

UNITED STATES PATENT AND TRADEMARK OFFICE
CERTIFICATE OF CORRECTION

PATENT NO: 5,684,556

DATED : November 4, 1997

INVENTOR(S) : MASAYUKI SHIMAMUNE                Page 1 of 3

It is certified that error appears in the above-identified patent and that said Letters Patent is hereby corrected as shown below:

ON TITLE PAGE AT [57], ABSTRACT

Line 1, "A a" should read --A--;
Line 7, "part," should read --port,--.

SHEET 3

Fig. 3, "SUBSTRATES" should read --SUBSTRATES TO--.

SHEET 6

Fig. 6, "SUBSTRATES" should read --SUBSTRATES TO--.

COLUMN 1

Line 19, "A-A" should read --1A-1A'--;
Line 22, "include" should read --includes--.

COLUMN 2

Line 25, "heads 5,..." should read --beads 5,...--;
Line 44, "3,.." should read --3b,..--;
Line 57, "connecting" (second occurrence) should be deleted.

COLUMN 4

Line 54, "A-A line" should read --A1-A1' line--.

UNITED STATES PATENT AND TRADEMARK OFFICE
CERTIFICATE OF CORRECTION

PATENT NO. : 5,684,556

DATED : November 4, 1997

INVENTOR(S): MASAYUKI SHIMAMUNE

It is certified that error appears in the above-identified patent and that said Letters Patent is hereby corrected as shown below:

COLUMN 5

Line 63, "crystal applying" should read
--crystal-applying--.

COLUMN 6

Line 12, "an" should read --a--;
Line 13, "switched." should read --switched on.--.

COLUMN 7

Line 44, "((S16" should read --((S16)--;
Line 49, "little" should be deleted;
Line 52, "is not required to" should read --does not require--.

COLUMN 8

Line 4, "case" should read --the case.

UNITED STATES PATENT AND TRADEMARK OFFICE
CERTIFICATE OF CORRECTION

PATENT NO. : 5,684,556

DATED : November 4, 1997

INVENTOR(S): MASAYUKI SHIMAMUNE

It is certified that error appears in the above-identified patent and that said Letters Patent is hereby corrected as shown below:

COLUMN 10

Line 15, "direction the" should read --direction to provide both terminal portions of the first substrate in the --.

Signed and Sealed this

Twenty-second Day of August, 2000

Attest:

Q. TODD DICKINSON

Attesting Officer

Director of Patents and Trademarks